(12) United States Patent
Sakashita et al.

(10) Patent No.: US 11,986,920 B2
(45) Date of Patent: May 21, 2024

(54) POLISHING METHOD, POLISHING AGENT AND CLEANING AGENT FOR POLISHING

(71) Applicant: KIOXIA CORPORATION, Tokyo (JP)

(72) Inventors: Mikiya Sakashita, Nagoya Aichi (JP); Yumiko Kataoka, Yokkaichi Mie (JP); Yukiteru Matsui, Nagoya Aichi (JP)

(73) Assignee: Kioxia Corporation, Tokyo (JP)

( * ) Notice: Subject to any disclaimer, the term of this patent is extended or adjusted under 35 U.S.C. 154(b) by 719 days.

(21) Appl. No.: 17/010,729

(22) Filed: Sep. 2, 2020

(65) Prior Publication Data

US 2021/0299814 A1    Sep. 30, 2021

(30) Foreign Application Priority Data

Mar. 24, 2020 (JP) .................. 2020-052315

(51) Int. Cl.
*B24B 37/015* (2012.01)
*B24B 37/013* (2012.01)
(Continued)

(52) U.S. Cl.
CPC .......... *B24B 37/015* (2013.01); *B24B 37/013* (2013.01); *C09G 1/02* (2013.01); *C08L 1/08* (2013.01)

(58) Field of Classification Search
CPC ... B24B 37/015; B24B 37/013; B24B 37/005; B24B 37/04; B24B 37/042; B24B 37/07; B24B 37/10; B24B 37/044; B24B 57/02; B24B 57/04; B24B 7/228; B24B 49/14; C09K 3/1454; C09G 1/02; H01L 21/30625; H01L 21/3212
(Continued)

(56) References Cited

U.S. PATENT DOCUMENTS 6,171,514 B1 * 1/2001 Hara ................. H01L 21/31053
438/692
6,354,913 B1 * 3/2002 Miyashita ............... B24B 37/24
106/3
(Continued)

FOREIGN PATENT DOCUMENTS

EP      1175964 A2 *  1/2002  .......... B24B 37/015
JP      H09255434 A    9/1997
(Continued)

OTHER PUBLICATIONS

Blazoka, Viscosity properties of aqueous solutions of hydroxyethylcellulose, 1989 (Year: 1989).*

(Continued)

*Primary Examiner* — Steven M Cernoch
*Assistant Examiner* — Steven Huang
(74) *Attorney, Agent, or Firm* — Kim & Stewart LLP

(57) ABSTRACT

According to one embodiment, a polishing method includes supplying a polishing agent to be between a polishing pad and to-be-polished surface, then polishing the to-be-polished surface with the polishing agent while rotating at least one of the to-be-polished surface and the polishing pad. The polishing agent includes abrasive grains and an organic polymer. The organic polymer makes a reversible phase transition between a gel state and a sol state depending on temperature.

15 Claims, 4 Drawing Sheets

(51) Int. Cl.
*C08L 1/08* (2006.01)
*C09G 1/02* (2006.01)

(58) Field of Classification Search
USPC .................................. 252/79.1–79.5; 216/89
See application file for complete search history.

(56) References Cited

U.S. PATENT DOCUMENTS

| | | | |
|---|---|---|---|
| 6,468,911 B1 * | 10/2002 | Miyashita | B24B 37/044 |
| | | | 438/692 |
| 6,561,876 B1 | 5/2003 | Tateyama et al. | |
| 6,827,752 B2 | 12/2004 | Nojo et al. | |
| 9,422,454 B2 | 8/2016 | Yamato et al. | |
| 9,458,415 B2 | 10/2016 | Li | |
| 9,880,464 B2 | 1/2018 | Kawamura et al. | |
| 10,586,694 B2 | 3/2020 | Kodera et al. | |
| 10,913,137 B2 | 2/2021 | Tanaka | |
| 2002/0192962 A1 | 12/2002 | Miyashita | |
| 2005/0126080 A1 | 6/2005 | Kon et al. | |
| 2007/0135020 A1 | 6/2007 | Nabeya | |
| 2011/0177623 A1 * | 7/2011 | Benner | B24B 57/02 |
| | | | 451/5 |
| 2012/0220195 A1 * | 8/2012 | Gawase | B24B 37/24 |
| | | | 451/7 |
| 2013/0045596 A1 | 2/2013 | Eda et al. | |
| 2019/0287826 A1 * | 9/2019 | Takagi | B24B 37/015 |
| 2019/0359855 A1 | 11/2019 | Liberatore | |
| 2021/0260719 A1 | 8/2021 | Kawasaki | |

FOREIGN PATENT DOCUMENTS

| | | |
|---|---|---|
| JP | 2000208456 A | 7/2000 |
| JP | 2001077060 A | 3/2001 |
| JP | 2007181910 A | 7/2007 |
| JP | 3957924 B2 | 8/2007 |
| JP | 2007273680 A | 10/2007 |
| JP | 4554363 B2 | 9/2010 |
| JP | 4787063 B2 | 10/2011 |
| JP | 2012079964 A | 4/2012 |
| JP | 2012126604 A | 7/2012 |
| JP | 5017574 B2 | 9/2012 |
| JP | 5036955 B2 | 9/2012 |
| JP | 2013042066 A | 2/2013 |
| JP | 2013232628 A | 11/2013 |
| JP | 2015512959 A | 4/2015 |
| JP | 5957292 B2 | 7/2016 |
| JP | 2017118062 A | 6/2017 |
| JP | 6162417 B2 | 7/2017 |
| JP | 2017139350 A | 8/2017 |
| JP | 2018186118 A | 11/2018 |
| JP | 2019160996 A | 9/2019 |
| KR | 20090038502 A * | 4/2009 ........... B24B 37/015 |
| WO | WO-2018116690 A1 * | 6/2018 ............ B24B 37/10 |

OTHER PUBLICATIONS

Translation of KR-20090038502-A (Year: 2009).*
Jain, Cellulose Derivatives as Thermoresponsive Polymer: An Overview, Dec. 2013 (Year: 2013).*
Translation of WO 2018116690 A1 (Year: 2017).*
Benyounes, Rheological behavior of Hydroxyethylcellulose (HEC) Solutions (Year: 2018).*
Pauline L. Nasatto et al., Methylcellulose, a Cellulose Derivative with Original Physical Properties and Extended Applications, Open Access, polymers, ISSN 2073-4360, 2015, 7, 777-803; doi:10.3390/polym7050777.
Nitis Sarkar, Kinetics of thermal gelation of methylcellulose and hydroxypropylmethylcellulose in aqueous solutions, Carbohydrate Polymers 26, 1995, 195-203.
Japanese Office Action dated Aug. 1, 2023, mailed in counterpart Japanese Application No. 2020-052315, 6 pages (with translation).

* cited by examiner

[N-isopropyl acrylamide]  [N,N-diethyl acrylamide]  [Caprolactam]  [Methyl ether]

[Polyethylene oxide]     [Polypropylene oxide]

[Polypeptide]

[Polyacrylamide]     $X^+$=H or Cation
[Polyacrylic acid]

X: THERMORESPONSIVE POLYMER MOIETY
R=H or $CH_3$

X: THERMORESPONSIVE POLYMER MOIETY

POLISHING METHOD, POLISHING AGENT AND CLEANING AGENT FOR POLISHING

CROSS-REFERENCE TO RELATED APPLICATION(S)

This application is based upon and claims the benefit of priority from Japanese Patent Application No. 2020-052315, filed Mar. 24, 2020, the entire contents of which are incorporated herein by reference.

FIELD

Embodiments described herein relate generally to polishing methods, a polishing agent, and a cleaning agent used for polishing.

BACKGROUND

In a semiconductor device manufacturing process, a polishing process is performed on a semiconductor substrate, films or layers formed on the substrate. Chemical mechanical polishing (CMP) is used for such a polishing process. In CMP, a demand exists for a method which stabilizes supply and discharge of a slurry-like polishing agent while enhancing its polishing performance. A CMP process sometimes requires polishing agents with different properties depending on the polishing required, and thus a polishing agent for which properties can be changed or varied depending on the polishing required.

DETAILED DESCRIPTION

Figure 1A:
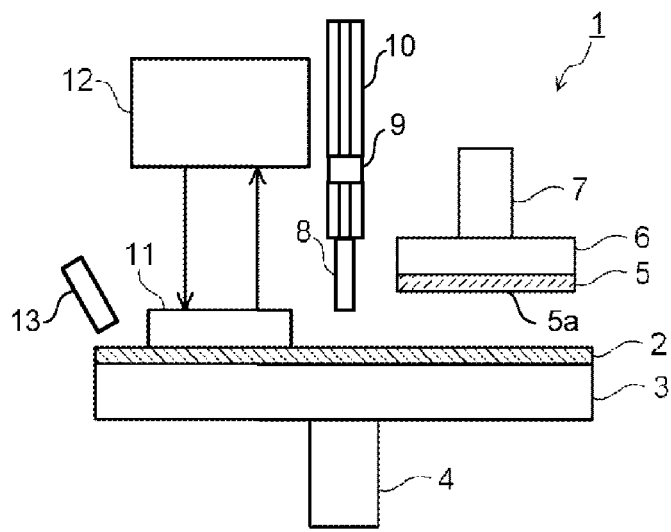
FIGS. 1A and 1B are cross-sectional views showing a polishing apparatus for use in a polishing method according to embodiments of the present disclosures.

Embodiments provide a polishing method that uses a polishing agent whose properties can be changed depending on various polishing steps, and also provide polishing agents and a cleaning agent.

In general, according to one embodiment, a polishing method comprises supplying a polishing agent to be between a to-be-polished surface and a polishing cloth (also referred to as a polishing pad), and then polishing the to-be-polished surface with the polishing agent while rotating at least one of the to-be-polished surface and the polishing cloth. The polishing agent comprises abrasive grains and an organic polymer. The organic polymer makes a reversible phase transition between a gel state and a sol state depending on a temperature.

Example embodiments of the present disclosure will now be described with reference to the drawings. In the drawings and in the following description, the same symbols are used for elements having substantially the same structure or configuration, and a description thereof will sometimes be omitted. It should be noted that the drawings are schematic. Thus, the depicted relationship between the thickness and the plane dimensions of a component or element, the thickness ratio between components or elements, etc. are not necessarily to scale.

First Embodiment

Figure 1B:
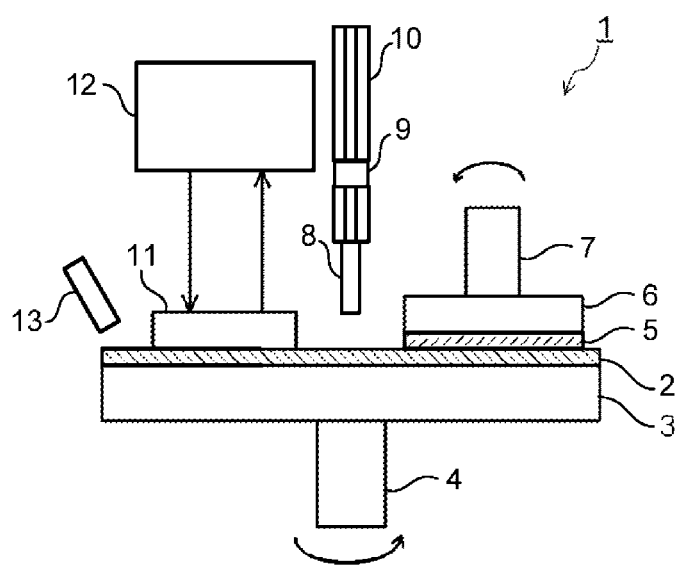

FIGS. 1A and 1B are diagrams showing a polishing apparatus for use in a polishing method according to a first embodiment. FIG. 1A illustrates a preparatory stage before a polishing process performed by the polishing apparatus 1 begins. FIG. 1B illustrates the polishing process being performed by the polishing apparatus 1. The polishing apparatus 1 includes a turntable 3 with a polishing cloth 2 provided on the surface thereof. The polishing cloth 2 may also be referred to as a polishing pad or the like. The turntable 3 has a rotating shaft 4, and is configured to be rotatable by rotating mechanism connected to the rotating shaft 4. The rotation speed of the turntable 3 may be adjusted or varied.

A polishing object 5 has a to-be-polished surface 5a. This surface 5a is placed in contact with the polishing cloth 2. The surface of the polishing object 5, opposite the surface 5a, is held by a holding section 6. The polishing object 5 is held by the holding section 6 such that the to-be-polished surface 5a faces the polishing cloth 2. The holding section 6 includes a rotating shaft 7 connected to the surface of the holding section 6 on a side opposite the surface contacting the polishing object 4. The rotating shaft 7 is configured to be rotatable by rotating mechanism connected to the rotating shaft 7. The rotation speed of the holding section 6 may be adjusted. The polishing apparatus 1 is a CMP apparatus for chemically and mechanically polishing the surface 5a.

A polishing agent supply section 8 is disposed above the polishing cloth 2. A polishing agent for use in polishing is supplied from the polishing agent supply section 8 to the polishing cloth 2. A thermometer 9 may be provided in the polishing agent supply section 8. The thermometer 9 can measure the temperature of the polishing agent being supplied. The polishing agent supply section 8 includes a polishing agent tank, a pump for adjusting the supply of the polishing agent, etc. The polishing agent is conveyed from the polishing agent tank to the polishing agent supply section 8 via the pump, etc., and supplied from the polishing agent supply section 8 onto the polishing cloth 2. The polishing agent will be between the polishing cloth 2 and the to-be-polished surface 5a during polishing. A temperature adjustment mechanism 10, such as a heater or cooler, may be provided in a pipe used for conveying the polishing agent from the polishing agent tank to the polishing agent supply section 8 as will be further described below. The temperature adjustment mechanism 10 is to control, for example, the phase state of the polishing agent being conveyed to the polishing agent supply section 8.

A temperature control section 11 is disposed on the polishing cloth 2. The temperature control section 11 is in contact with the polishing cloth 2. The temperature control section 11 is a temperature control slider device which brings a heat exchange body into contact with the surface of the polishing cloth 2. A heated or cooled medium is supplied from a thermal regulator 12 into the temperature control section 11. By bringing the temperature control section 11 into contact with the polishing cloth 2, heat exchange is effected between the temperature control section 11 and the polishing cloth 2, whereby the temperature of the polishing cloth 2, and thus the temperature of the to-be-polished surface 5a of the polishing object 5, which is in contact with the polishing cloth 2, can be controlled (by heating or cooling) to be at a predetermined temperature. The polishing apparatus 1 has a temperature measuring instrument 13, such as a radiation thermometer, for measuring the temperature of the polishing cloth 2. For example, when water is used as the heat exchange medium, the temperature of the polishing cloth 2 is controlled in the range of 20° C. to 90° C.

When carrying out polishing of the to-be-polished surface 5a by using the polishing apparatus 1 shown in FIGS. 1A and 1B, the holding section 6 is moved to bring the to-be-polished surface 5a into contact with the polishing cloth 2, as shown in FIG. 1B. While supplying the polishing agent from the polishing agent supply section 8 onto the polishing cloth 2, the holding section 6 holding the polishing object 5 and the turntable 3 having the polishing cloth 2 are rotated so as to cause the to-be-polished surface 5a and the polishing cloth 2 to slide relative to each other, thereby effecting polishing of the to-be-polished surface 5a. In such a polishing process, a slurry-like polishing agent (slurry liquid) containing abrasive grains and an organic polymer is used as the polishing agent.

Examples of the abrasive grains may include, but are not limited to, silicon oxide ($SiO_2$) abrasive grains and cerium oxide ($CeO_2$) abrasive grains. The slurry-like polishing agent (slurry liquid) is prepared by dispersing the abrasive grains and the organic polymer in water or an organic solvent such as an alcohol. The organic polymer is used to adjust the viscosity of the slurry liquid and to adjust the polishing performance by covering the surfaces of the abrasive grains. The use of a high-viscosity slurry-like polishing agent is sometimes desired in polishing.

For example, in a semiconductor device manufacturing process, a raised defect or foreign matter (particle defect) is sometimes on the surface of a to-be-processed substrate which has undergone deposition of a film(s) and an etching process. When an additional film is deposited on such a raised defect, the range of influence of the raised defect broadens due to the lens effect, causing a decrease in the yield, a focus error in a photolithography process, etc. With recent progress in three-dimensional device structure, the thickness of a laminate film is drastically increasing, and therefore the above problems are becoming more and more serious. Similarly, in a nanoimprint lithography process, a patterned template directly contacts a semiconductor substrate. Therefore, a raised defect on the substrate may cause breakage of the template.

In order to remove a raised defect, CMP is performed on a semiconductor substrate with a to-be-processed film already thereon. With such a CMP process it is sometimes required to increase the viscosity of a slurry in order to enhance the performance for removal of a raised defect. However, the use of a high-viscosity slurry necessitates the use of a high air pressure, etc. for supply of the slurry, which requires higher equipment investment.

In view of this, in the first embodiment, an organic polymer which makes a reversible phase transition between a gel state and a sol state depending on the temperature, and which is thus capable of adjusting the viscosity, is used as the organic polymer added to the slurry-like polishing agent. Preferably, the viscosity of the organic polymer also changes depending on the shear rate. Some organic polymers have the property of making a phase transition from a sol state, in which they are soluble in water or an organic solvent, to a gel state with an increase in the temperature.

Figure 2:
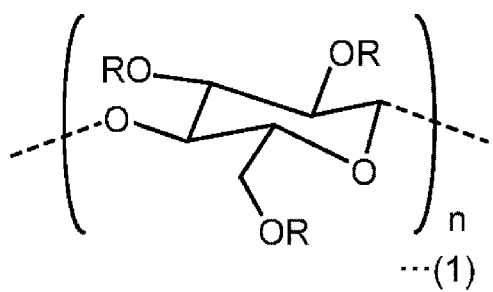
FIG. 2 is a diagram showing the structure of an alkyl cellulose for use as an organic polymer in a first embodiment.

One type of such an organic polymer is exemplified by an alkyl cellulose as shown in FIG. 2. In FIG. 2, a monovalent organic group, for example, an alkyl group such as a methyl group, an ethyl group or a propyl group, a carboxyl group (—C(═O)OH), or a hydroxyalkyl group in which at least one of the hydrogen atoms of an alkyl group is substituted by a hydroxy group (—OH), may be used as an R group. The monovalent organic groups used for the R groups are not limited to a single type, for example two or more types may be used. Additionally, at least one of the R groups may be a hydrogen atom. That is, the R groups in FIG. 2 may be independently selected from among hydrogen atoms, alkyl groups, a carboxyl group, or a hydroxyalkyl group.

Figure 3:
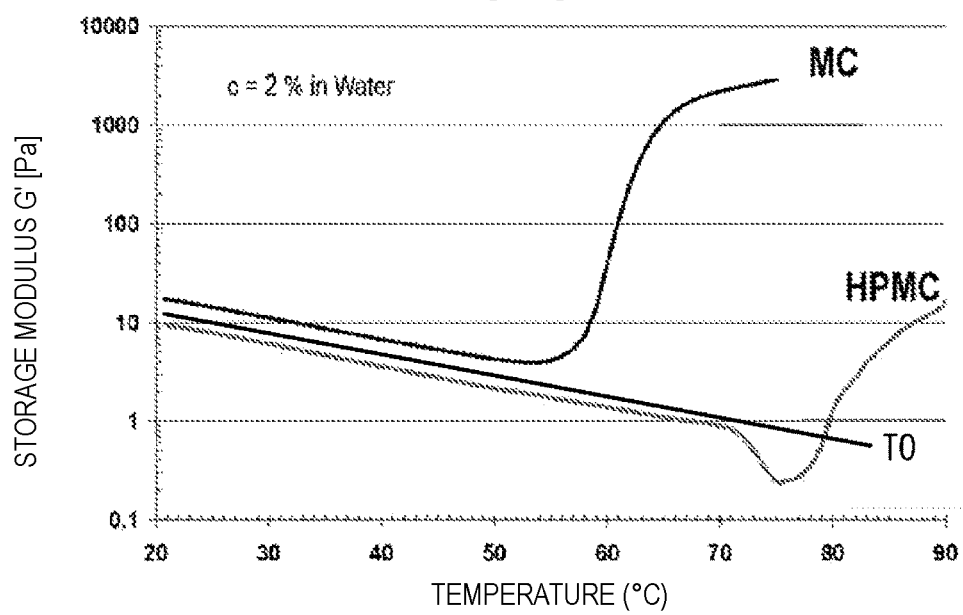
FIG. 3 is a graph showing temperature-dependent storage moduli of organic polymers for use in a first embodiment.

FIG. 3 shows the temperature-dependent change in the storage modulus of methyl cellulose (MC) and hydroxypropylmethyl cellulose (HPMC), which are both examples of alkyl celluloses.

As shown in FIG. 3, methyl cellulose (MC) has a storage modulus (G') of about 10 Pa at room temperature (around 25° C.) and, as with a common organic polymer, the storage modulus decreases with increase in the temperature over a certain range. However, the storage modulus begins to increase at a certain temperature (about 55° C.) and reaches a value of not less than 2000 Pa at a temperature of around 75° C. Likewise, hydroxypropylmethyl cellulose (HPMC) has a storage modulus (G') of about 10 Pa at room temperature (around 25° C.), and the storage modulus decreases with increase in the temperature over a certain range; however, the storage modulus of HPMC begins to increase at a certain temperature (about 75° C.) and reaches a value of not less than 20 Pa at a temperature of around 90° C. Dynamic elastic modulus is one of physical quantities that describe the viscoelasticity of an object, and is expressed as a complex modulus. A storage modulus coincides with the real part of a complex modulus, and corresponds to the viscosity. The storage modulus (viscosity) of most common organic polymers decreases linearly with increase in the temperature, as shown by the graph line "T0" in FIG. 3.

The above-described viscosity change of alkyl cellulose is based on a temperature-dependent sol-gel phase transition. As described above, an alkyl cellulose has a storage modulus of about 10 Pa at room temperature (around 25° C.). This is because the alkyl cellulose is in a sol state at this temperature. The increase in the viscosity of an alkyl cellulose with increase in the temperature is due to a phase transition from a sol state to a gel state. By using an organic polymer which makes a reversible phase transition between a gel state and a sol state depending on the temperature as an additive in the polishing agent, it becomes possible to adjust the viscosity of the polishing agent depending on its usage conditions.

Figure 4:
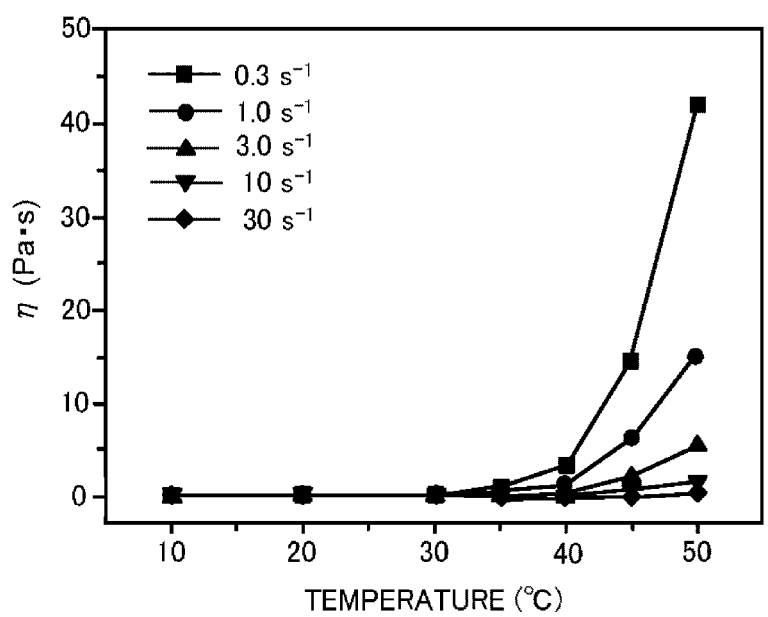
FIG. 4 is a graph showing temperature and shear rate dependent viscosities of an organic polymer for use in a first embodiment.

As shown in FIG. 4, the viscosity of an alkyl cellulose also changes depending on shear rate. FIG. 4 shows how the viscosities of alkyl celluloses, measured at different rotation speeds (revolutions per time) corresponding to different shear rates, change with the temperature. In FIG. 4, the shear rate $0.3\ s^{-1}$ corresponds to 18 rpm. Likewise, the shear rate $1.0\ s^{-1}$ corresponds to 60 rpm, $3.0\ s^{-1}$ to 180 rpm, $10\ s^{-1}$ to 600 rpm, and $30\ s^{-1}$ to 1800 rpm.

As can be seen in FIG. 4, when the shear rate applied to the alkyl cellulose is increased from 0.3 s$^{-1}$ to 30 s$^{-1}$ at 50° C., the alkyl cellulose changes from a high-viscosity state having a viscosity of not less than 40 Pa·s to a low-viscosity state having a viscosity of about 1 Pa·s. Therefore, the viscosity of the polishing agent containing an alkyl cellulose may be adjusted by changing the rotation speed of at least one of the holding section 6 and the turntable 3 during a polishing process.

For a polishing operation for the to-be-polished surface 5a using the polishing apparatus 1 shown in FIG. 1, a polishing agent which exhibits a high viscosity during a polishing process is sometimes required. A polishing agent which has a high viscosity in an ordinary handling state has problems associated with supplying the polishing agent, a high cost of an apparatus for supplying such a polishing agent, etc. A polishing agent containing an organic polymer, such as an alkyl cellulose, whose viscosity changes with the temperature is therefore be advantageously used. For example, when supplying the polishing agent from the polishing agent supply section 8 onto the polishing cloth 2, the polishing agent can be in a low-temperature (e.g., room temperature to about 30° C.) when initially supplied. The viscosity of the polishing agent being supplied may thus be about 1 Pa·s when an alkyl cellulose is used. Therefore, the polishing agent can be supplied relatively easily by the polishing agent supply section 8. When subsequently carrying out a polishing process, the temperature of the polishing cloth 2 is raised by the temperature control section 11 to increase the viscosity of the polishing agent. When the temperature of the polishing cloth 2 is raised to about 50° C., in the case of using an alkyl cellulose, the viscosity of the polishing agent may become about 15 Pa·s. Accordingly, the to-be-polished surface 5a of the polishing object 5 can be polished efficiently.

Further, in a polishing operation for the to-be-polished surface 5a using the polishing apparatus 1 shown in FIG. 1, a polishing agent is sometimes required to change its viscosity during a polishing process. In particular, in the early stage (initial stage) of a polishing process, a high-viscosity polishing agent is sometimes required in order to increase the polishing or planarization rate of the surface 5a. In the later stage of the polishing process, a low-viscosity polishing agent is sometimes required in order to promote removal of scratches, polishing traces, etc., which have been produced by the earlier polishing of the surface 5a and enhancing the flatness of the surface 5a. A polishing agent containing an organic polymer, such as an alkyl cellulose, whose viscosity changes with the temperature can therefore be effectively used. More specifically, such a polishing process maybe carried out in the following manner.

When supplying the polishing agent from the polishing agent supply section 8 onto the polishing cloth 2, the polishing agent is supplied in a low-temperature state (e.g., at about room temperature to about 30° C.). The viscosity of the polishing agent being supplied may be about 1 Pa·s, which corresponds to a low-viscosity state, when an alkyl cellulose is used as described above. Therefore, the polishing agent can be supplied well by a common polishing agent supply section 8. Subsequently, at the start of a polishing process, the temperature of the polishing cloth 2 is raised to about 50° C. to thereby bring the polishing agent into a high-viscosity state. Polishing of the to-be-polished surface 5a is performed with the polishing agent in this state (first polishing step). By polishing the to-be-polished surface 5a with the polishing agent in a high-viscosity state, abrasive grains can be better entrained with in the organic polymer, and therefore the abrasive grains can be effectively held on the polishing cloth 2. This can enhance the polishing performance of the abrasive grains, thus increasing the polishing or planarization rate of the to-be-polished surface 5a. Subsequently, the temperature of the polishing cloth 2 is lowered by the temperature control section 11 to reduce the viscosity of the polishing agent. When the temperature of the polishing cloth 2 is lowered to about 30° C. in the case of using an alkyl cellulose, the viscosity of the polishing agent will become about 1 Pa·s. This reduces aggression and stimulation of the polishing agent to the to-be-polished surface 5a of the polishing object 5, making it possible to remove scratches, polishing traces, etc. and enhance the flatness of the to-be-polished surface 5a.

Some specific examples of the above-described polishing process will now be described. The following description illustrates a case in which methyl cellulose is used as an organic polymer and cerium oxide is used as abrasive grains.

In Example 1, the polishing agent in a room-temperature state (at 25° C.) is first supplied onto the polishing cloth 2, which is also in a room-temperature state (at 25° C.). The polishing agent being supplied is in a low-viscosity state. Subsequently, at the start of a polishing process, the temperature of the polishing cloth 2 is raised to 50° C. and the rotation speed of the turntable 3 is set at 100 rpm, and polishing of the to-be-polished surface 5a is carried out with the polishing agent in a high-viscosity state. Subsequently, the temperature of the polishing cloth 2 is lowered to 25° C. with the temperature control section 11, while maintaining the temperature, the rotation speed of the turntable 3 is increased to 500 rpm. The polishing agent becomes a low-viscosity state due to the lowering of the temperature and the increase in the rotation speed. Polishing of the to-be-polished surface 5a is carried out while keeping the polishing agent in the low-viscosity state.

In Example 2, the polishing agent in a room-temperature state (at 25° C.) is first supplied onto the polishing cloth 2 in a room-temperature state (at 25° C.). The polishing agent being supplied is in a low-viscosity state. Subsequently, at the start of a polishing process, the temperature of the polishing cloth 2 is raised to 50° C. and the rotation speed of the turntable 3 is set at 100 rpm, and polishing of the to-be-polished surface 5a is carried out with the polishing agent in a high-viscosity state. Subsequently, while maintaining the temperature of the polishing cloth 2 at 50° C. with the temperature control section 11, the rotation speed of the turntable 3 is increased to 500 rpm. The polishing agent becomes a low-viscosity state due to the increase in the rotation speed. Polishing of the to-be-polished surface 5a is carried out while keeping the polishing agent in the low-viscosity state. The viscosity of the polishing agent can thus be lowered by simply increasing the rotation speed.

In Example 3, the polishing agent in a room-temperature state (at 25° C.) is first supplied onto the polishing cloth 2 in a room-temperature state (at 25° C.). The polishing agent being supplied is in a low-viscosity state. Subsequently, at the start of a polishing process, the temperature of the polishing cloth 2 is raised to 50° C. and the rotation speed of the turntable 3 is set at 100 rpm, and polishing of the to-be-polished surface 5a is carried out with the polishing agent in a high-viscosity state. Subsequently, while maintaining the rotation speed of the turntable 3 at 100 rpm, the temperature of the polishing cloth 2 is lowered to 25° C. with the temperature control section 11. The polishing agent becomes a low-viscosity state due to the lowering of the temperature. Polishing of the surface 5a is carried out while keeping the polishing agent in the low-viscosity state. The viscosity of the polishing agent can thus be lowered by simply lowering the temperature.

After completion of the above-described polishing process, the temperature of the polishing cloth 2 is lowered with the temperature control section 11 to thereby reduce the viscosity of the polishing agent. When the temperature of the polishing cloth 2 is lowered to about 30° C. in the case of using an alkyl cellulose, the viscosity of the polishing agent will become about 1 Pa·s. Therefore, the low-viscosity polishing agent can be efficiently discharged from the system (or polishing apparatus). When a polishing process is carried out using the polishing agent having a low viscosity, the polishing agent may be discharged from the system while maintaining the in-process state of the polishing agent.

In the polishing method of the first embodiment, the viscosity of the polishing agent is expected to be more than 0 Pa·s but not more than 50 Pa·s. During supply or discharge of the polishing agent, the viscosity of the polishing agent is preferably more than 0 Pa·s but not more than 5 Pa·s. In a polishing process using the polishing agent in a high-viscosity state, the viscosity of the polishing agent is preferably more than 5 Pa·s but not more than 15 Pa·s. In a polishing process using the polishing agent in a low-viscosity state, the viscosity of the polishing agent is preferably more than 0 Pa·s but not more than 5 Pa·s. The organic polymer for use in the polishing agent of the first embodiment can be made to have a viscosity that lies in the above ranges by adjusting the temperature and/or the shear rate as appropriate. It therefore becomes possible to enhance the polishing performance in a polishing process while still permitting supply and discharge of the polishing agent in an appropriate manner.

Second Embodiment

In the second embodiment, as with the first embodiment, polishing of the surface 5a of the polishing object 5 is performed using the polishing apparatus 1 shown in FIG. 1. As described above with reference to the first embodiment, the polishing apparatus 1 includes a turntable 3 having a polishing cloth 2, a holding section 6 for holding the polishing object 5, a polishing agent supply section 8 for supplying a polishing agent onto the polishing cloth 2, and a temperature control section 11 for adjusting the temperature of the polishing cloth 2. The detailed configuration of the polishing apparatus 1 as well as the details of various components, including the rotating mechanism, are as described above with reference to the first embodiment.

A slurry-like polishing agent (slurry liquid) containing abrasive grains and an organic polymer is used as the polishing agent. Examples of the abrasive grains may include, but are not limited to, silicon oxide ($SiO_2$) abrasive grains and cerium oxide ($CeO_2$) abrasive grains. The slurry-like polishing agent (slurry liquid) is prepared by dispersing or dissolving the abrasive grains and the organic polymer in water or an organic solvent such as an alcohol. The organic polymer is used to adjust the viscosity of the slurry liquid and, in addition, to adjust the polishing performance by covering the surfaces of the abrasive grains. Preferably, the pH of the polishing agent is adjusted with a pH adjuster to a value suitable for the polishing process.

In the second embodiment, an organic polymer which makes a reversible phase transition between a gel state and a sol state in a medium such as water or an organic solvent depending on the temperature, and which is thus capable of adjusting the viscosity of the polishing agent is used as an additive to the slurry-like polishing agent. A first example of such an organic polymer is a thermoresponsive polymer which maintains a sol state in a medium, such as water or an organic solvent, and dissolves in the medium at a temperature of not higher than a lower critical solution temperature (LCST), and which makes a phase transition to a gel state when heated to a temperature exceeding the LCST. Such a thermoresponsive polymer is hereinafter referred to as a first thermoresponsive polymer or a first-type thermoresponsive polymer.

A second example thereof is a thermoresponsive polymer which maintains a sol state and dissolves in a medium at a temperature exceeding an upper critical solution temperature (UCST), and which makes a phase transition to a gel state when cooled to a temperature of not more than the UCST. Such a thermoresponsive polymer is hereinafter referred to as a second thermoresponsive polymer or a second-type thermoresponsive polymer.

In the polishing agent containing the above-described first or second thermoresponsive polymer, the thermoresponsive polymer makes a phase transition to a gel state or a sol state on the to-be-polished surface 5a or on the surface of the polishing cloth 2 in response to a change in the surface temperature of the polishing cloth 2. The chemical reactivity and the mechanical polishing properties of abrasive grains coated with the thermoresponsive polymer significantly changes the polishing rate, the anti-scratch performance, the polishing selectivity, and the flatness of polished surface upon CMP polishing. Further, since the thermoresponsive polymer makes a reversible phase transition in response to a change in temperature, reversible control of the polishing performance, etc. is possible.

Furthermore, the thermoresponsive polymer is chemically modified easily in the molecular backbone. By introducing a chelate moiety having a metal ion-capturing function into the polymer, the polymer can be made to function as a cleaning agent for metal ions. Metal ions contained in the to-be-polished surface 5a or in a catalyst, etc. can be captured by the cleaning agent, and later discharged together with the cleaning agent. Since the thermoresponsive polymer in a sol state is soluble in the medium, supply and discharge of the polishing agent to and from the CMP apparatus 1 can be performed with ease. Anionic polymers used heretofore as polishing agents, do not exhibit a noticeable phase transition in response to a change in temperature over relevant ranges. With the second embodiment, it is possible to enhance the polishing rate with high precision, reduce polishing scratches, ensure polishing selectivity, enhance the flatness of polished surface, and streamline the process through a reduction of a cleaning step.

The first-type and second-type thermoresponsive polymers can be further classified into water-soluble polymers, hydrophobic polymers, and surfactants. The thermoresponsive polymer, when it is supplied to the polishing apparatus 1, takes the form of a sol in which the polymer is dissolved. The temperatures of ancillary facilities and pipes in the apparatus can be adjusted so that the thermoresponsive polymer in a sol state can be supplied into the polishing apparatus 1. The basic structure of the thermoresponsive polymer is a polymer comprising polymerized thermoresponsive monomer molecules which exhibit a sol-gel phase transition in response to a change in temperature.

Figure 5:
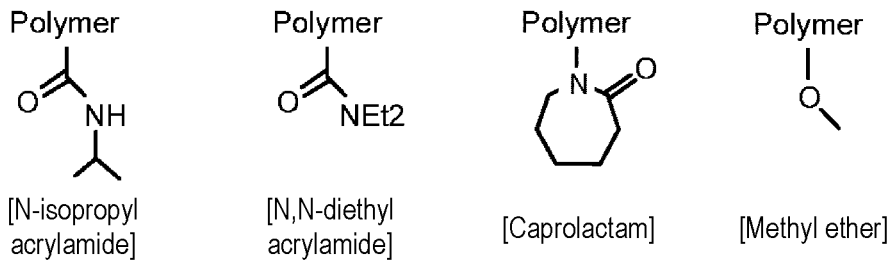
FIG. 5 is a diagram showing structures of organic polymers for use in polishing agents in a second embodiment.

As shown in FIG. 5, functional groups of monomers that turn into a gel at a temperature of not less than a sol-gel phase transition temperature (LCST) include an N-isopropylacrylamide group (30-34° C.), an N,N-diethylacrylamide group (26-35° C.), a caprolactam group (N-vinylcaprolactam) (30-50° C.), a methoxy group (methyl vinyl ether) (37° C.), etc.

Figure 6:
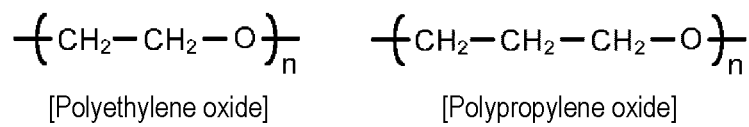
FIG. 6 is a diagram showing structures of organic polymers for use in polishing agents in a second embodiment.
Figure 6:
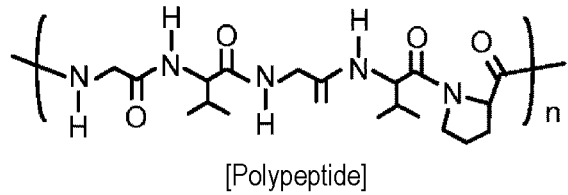

As shown in FIG. 6, main chains of polymers that turn into a gel at a temperature of not less than a sol-gel phase transition temperature (LCST) include a carbon chain or a complex carbon chain having an ethylene oxide moiety (20-85° C.), a propylene oxide moiety (20-85° C.), a peptide moiety (28-30° C.), etc. In this context, a complex carbon chain refers to a carbon chain containing oxygen (O), nitrogen (N), sulfur (S), or the like as a part of the chain. The values shown in parentheses above each represent a sol-gel phase transition temperature.

Figure 7:
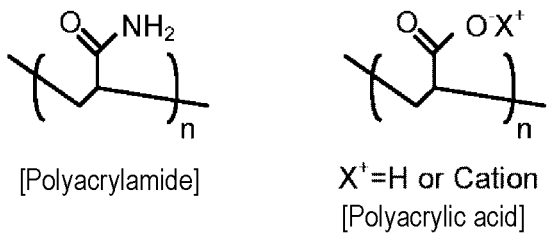
FIG. 7 is a diagram showing structures of organic polymers for use in polishing agents in a second embodiment.
Figure 8:
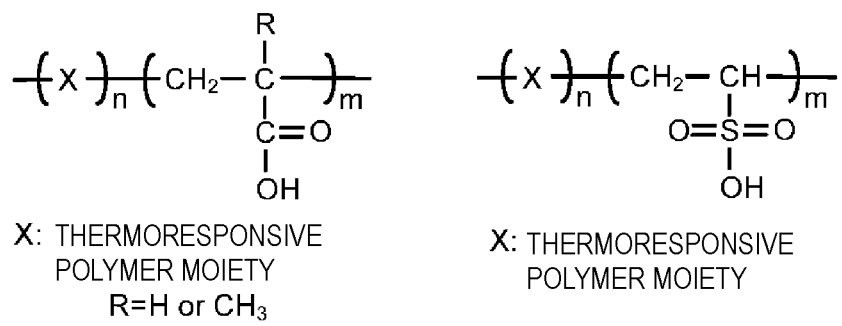
FIG. 8 is a diagram showing structures of organic polymers for use in polishing agents in a second embodiment.

As shown in FIG. 7, functional groups of monomers that turn into a gel at a temperature of not higher than a sol-gel phase transition temperature (UCST) include acrylamide (25° C.), acrylic acid (25° C.) as at least part of a main chain. Further, as shown in FIG. 8, the thermoresponsive polymer may contain, in its backbone, polyacrylic acid, polymethacrylic acid, polysulfonic acid, or a salt thereof which has the property of adsorbing to the surfaces of abrasive grains.

The thermoresponsive polymer may be, for example, a copolymer comprising a monomer moiety having the property of adsorbing to the surfaces of abrasive grains and a thermoresponsive monomer moiety. The polymerization proportions of these monomer moieties in the copolymer may be the same or different from each other. There is no particular limitation on the type of the copolymer: the copolymer may be any of a random copolymer, an alternating copolymer, a block copolymer and a graft copolymer. The weight-average molecular weight of the thermoresponsive polymer, which can be controlled by the degree of polymerization, is preferably not less than 1,000 and not more than 5,000,000.

In a polishing operation for the to-be-polished surface 5a in the second embodiment, the polishing agent is sometimes required to change its viscosity during a polishing process. In particular, in the early stage (initial stage) of a polishing process, the polishing agent is sometimes required to have a high viscosity in order to increase the polishing or planarization rate of the to-be-polished surface 5a. In the later stage of the polishing process, the polishing agent is sometimes required to have a low viscosity in order to remove scratches, polishing traces, etc., which have been produced by earlier polishing of the surface 5a, thereby enhancing the flatness of the to-be-polished surface 5a.

In the first example using a first thermoresponsive polymer as an additive, when supplying the polishing agent from the polishing agent supply section 8 onto the polishing cloth 2, the temperature of the polishing agent is adjusted so that the first thermoresponsive polymer in the polishing agent is kept in a sol state. When the first thermoresponsive polymer (polymer having an LCST) is used, the temperature of the polishing cloth 2 is held at 0 to 20° C. before the start of polishing to keep the first thermoresponsive polymer in a sol state. When the temperature of the polishing cloth 2 is raised to 60 to 90° C. at the start of polishing, the polymer makes a sol-to-gel phase transition, and abrasive grains are taken in the gel-state polymer. The abrasive grains are held in the polymer that has turned into a gel state in pores of the polishing cloth 2, and are thus held in the polishing cloth 2. The abrasive grains are fixed in the polishing cloth 2 and do not move or roll. Therefore, the abrasive grains polish or grind the to-be-polished surface 5a effectively, resulting in a high polishing rate. Furthermore, since the abrasive grains are firmly held in the polishing cloth 2, the formation of defects, such as polishing scratches, in the to-be-polished surface 5a can be reduced. Subsequently, the temperature of the polishing cloth 2 is adjusted to 0 to 20° C. so that the first thermoresponsive polymer turns into a sol state. After performing polishing while keeping the polymer in a sol state, the polishing agent is discharged from the system. Since the polymer is in a sol state, the polishing agent can be discharged well.

In the second example using a second thermoresponsive polymer as an additive, when supplying the polishing agent from the polishing agent supply section 8 onto the polishing cloth 2, the temperature of the polishing agent is adjusted so that the second thermoresponsive polymer in the polishing agent is kept in a sol state. The temperature adjustment is performed by adjusting the temperature of the polishing agent supply section 8, the temperature of a pipe extending to the polishing agent supply section 8, etc. When the second thermoresponsive polymer (polymer having a UCST) is used, the temperature of the polishing cloth 2 is held at 30 to 80° C. before the start of polishing to keep the second thermoresponsive polymer in a sol state. When the temperature of the polishing cloth 2 is lowered to 0 to 20° C. at the start of polishing, the polymer makes a sol-to-gel phase transition, and abrasive grains are taken in the gel-state polymer. The abrasive grains are held in the polymer that has turned into a gel state in pores of the polishing cloth 2, and are thus held in the polishing cloth 2. The abrasive grains are fixed in the polishing cloth 2 and do not move or roll. Therefore, the abrasive grains polish or grind the to-be-polished surface 5a effectively, resulting in a high polishing rate. Furthermore, since the abrasive grains are firmly held in the polishing cloth 2, the formation of defects, such as polishing scratches, in the to-be-polished surface 5a can be reduced. Subsequently, the temperature of the polishing cloth 2 is adjusted to 30 to 80° C. so that the second thermoresponsive polymer turns into a sol state. After performing polishing while keeping the polymer in a sol state, the polishing agent is discharged from the system. Since the polymer is in a sol state, the polishing agent can be discharged well.

The thermoresponsive polymer for use in the second embodiment is in a sol state when it is supplied to the polishing apparatus 1. The first thermoresponsive polymer (polymer having an LCST) is kept in a sol state before the start of polishing because the temperature of the polishing cloth 2 is held at 0 to 20° C. When the temperature of the polishing cloth 2 is raised to 60 to 90° C. at the start of polishing, the polymer makes a sol-to-gel phase transition, and abrasive grains are taken in the gel-state polymer. The second thermoresponsive polymer (polymer having a UCST) is kept in a sol state before the start of polishing because the temperature of the polishing cloth 2 is held at 30 to 80° C. When the temperature of the polishing cloth 2 is lowered to 0 to 20° C. at the start of polishing, the polymer makes a sol-to-gel phase transition, and abrasive grains are taken in the gel-state polymer. The abrasive grains are held in the polymer (the first or second thermoresponsive polymer) that has turned into a gel state in pores of the polishing cloth 2, and are thus held in the polishing cloth 2. The abrasive grains are fixed in the polishing cloth 2 and do not move or roll. Therefore, the abrasive grains polish or grind the to-be-polished surface 5a effectively, resulting in a high polishing rate. Furthermore, since the abrasive grains are firmly held in the polishing cloth 2, the formation of defects, such as polishing scratches, in the to-be-polished surface 5a can be reduced.

When the thermoresponsive polymer is one which has the property of adsorbing to the abrasive grains, the polymer in a gel state, with which the abrasive grains have been coated after the temperature change, is detached during polishing under application of a high load. This achieves a high polishing rate for raised portions, resulting in enhanced flatness of the polished surface 5a. Polishing agent waste, remaining on or in the polishing cloth, can be quickly discharged by turning the polymer into a sol state by lowering the temperature to 0 to 20° C. in the case of the first thermoresponsive polymer (polymer having an LCST), and by raising the temperature to 30 to 60° C. in the case of the second thermoresponsive polymer (polymer having a UCST). The hardness of the polymer in a gel state can be controlled by selection of the polymerization proportion of a thermoresponsive moiety or selection of its molecular weight, or by adjustment of the concentration.

A cleaning agent using a thermoresponsive polymer (a polymer having an LCST or UCST) will now be described. The cleaning agent is a solution or dispersion of the same thermoresponsive polymer as that used in the polishing agent. The cleaning agent includes a medium such as water or an organic medium, such as an alcohol. As with the polishing agent, usable thermoresponsive polymers can be classified into water-soluble polymers, hydrophobic polymers, and surfactants. The cleaning agent, when it is supplied to the polishing apparatus 1, takes the form of a sol in which the polymer is dissolved in a medium. The temperatures of ancillary facilities and pipes in the apparatus are adjusted so that the cleaning agent in a sol state can be supplied into the polishing apparatus 1.

Figure 9:
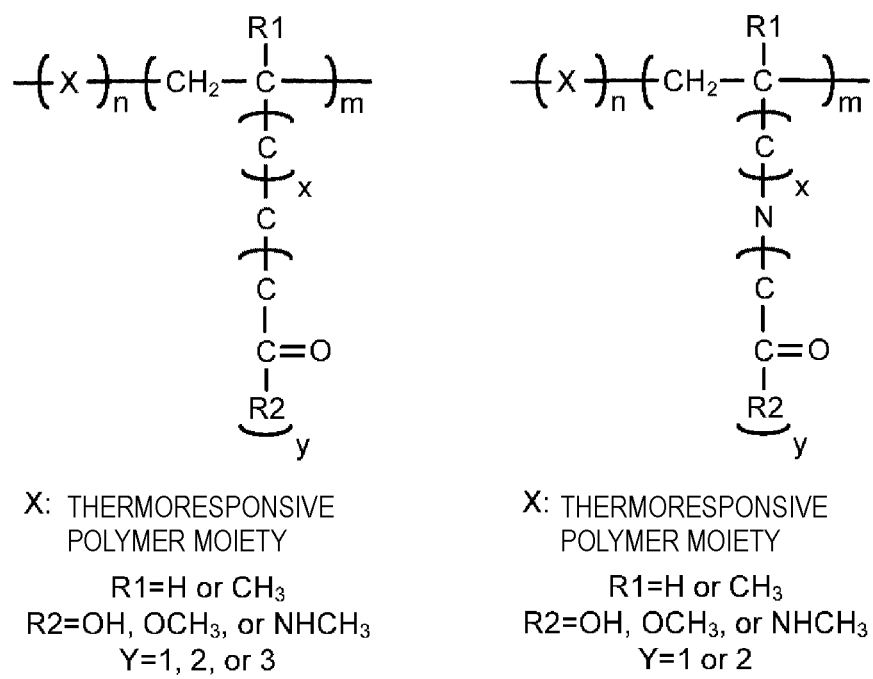
FIG. 9 is a diagram showing structures of organic polymers for use in polishing agents in a second embodiment.

Properties as a metal ion cleaning agent are obtained by introducing a chelate moiety having a metal ion-capturing function into at least part of thermoresponsive monomer molecules that exhibit a sol-gel phase transition in response to a change in temperature. The basic structure of the thermoresponsive polymer for use in the cleaning agent is a polymer comprising polymerized thermoresponsive monomer molecules having a chelate moiety. FIG. 9 schematically shows the molecular structures of thermoresponsive polymers for use in the cleaning agent. The basic structure of each polymer is a copolymer synthesized through a polymerization reaction between monomer molecules having the property of chelating a metal ion and monomer molecules that exhibit a sol-gel phase transition in response to a change in temperature.

As shown in FIG. 9, the chelate moiety may be a moiety having a functional group containing a carboxylic acid, an amide, an ester, an amine, or a salt thereof. The functional group and the main chain of the monomers that exhibit a sol-gel phase transition may be the same as those of the polymers for the polishing agents, shown in FIGS. 5 through 8. The copolymerization of such comonomers provides a thermoresponsive polymer having the property of chelating a metal ion. The polymerization proportions of the monomer moieties in the copolymer may be the same or different from each other. There is no particular limitation on the type of the copolymer: the copolymer may be any of a random copolymer, an alternating copolymer, a block copolymer and a graft copolymer. The weight-average molecular weight of the thermoresponsive polymer, which can be controlled by the degree of polymerization, is preferably not less than 1,000 and not more than 5,000,000.

The cleaning agent is supplied to the polishing apparatus 1 in such a manner that the thermoresponsive polymer is kept in a sol state. In the case of the first thermoresponsive polymer (polymer having an LCST), the temperature of the polishing cloth 2 is held at 0 to 20° C. in the initial cleaning stage, and therefore the polymer is kept in a sol state. After the start of cleaning, the temperature of the polishing cloth 2 is raised to 60 to 90° C., so that the polymer makes a sol-to-gel phase transition. The polymer shrinks due to dehydration and significantly reduces its volume, whereby the chelate moieties approach each other and can therefore stably capture metal ions. After completion of the cleaning, the temperature of the polishing cloth 2 is lowered to 0 to 20° C. so as to turn the polymer into a sol state. Therefore, the cleaning waste remaining on and in the polishing cloth 2 can be discharged quickly. In the case of the second thermoresponsive polymer (polymer having a UCST), the temperature of the polishing cloth 2 is held at 30 to 80° C. in the initial cleaning stage, and therefore the polymer is kept in a sol state. After the start of cleaning, the temperature of the polishing cloth 2 is lowered to 0 to 20° C., so that the polymer makes a sol-to-gel phase transition. The polymer shrinks due to dehydration and significantly reduces its volume, whereby the chelate moieties approach each other and can therefore stably capture metal ions. After completion of the cleaning, the temperature of the polishing cloth 2 is raised to 30 to 60° C. so as to turn the polymer into a sol state. Therefore, the cleaning waste remaining on and in the polishing cloth 2 can be discharged quickly.

A phase transition of a thermoresponsive polymer can be identified as follows. The determination is made based on a change in the hydrodynamic radius (Stokes radius) $R_H$ defined by the following Stokes-Einstein relation: $D=k_BT/6\pi\eta_0 R_H$, wherein D represents diffusion coefficient and $\eta_0$ represents viscosity of the fluid. The occurrence of a phase transition is determined when the rate of change in the hydrodynamic radius according to the value $[1-R_H/R_{HO}]$, where $R_{HO}$ represents the hydrodynamic radius of the polymer before a change in temperature (in a sol state), and $R_H$ represents the hydrodynamic radius of the polymer upon the change in temperature (in a gel state) being not less than 0.3. Alternatively, the occurrence of a phase transition can be determined when the rate of change in the light transmittance according to the value of $[1-I/I_O]$, where $I_O$ represents the light transmittance of the polymer before a change in temperature (in a sol state), and I represents the light transmittance of the polymer upon the change in temperature (in a gel state) being not less than 0.3.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A polishing method, comprising:
    supplying a polishing agent at a first temperature to be between a to-be-polished surface and a polishing cloth; and
    polishing the to-be-polished surface with the polishing agent while rotating at least one of the to-be-polished surface and the polishing cloth, wherein
    the polishing agent comprises abrasive grains and an organic polymer which makes a reversible phase transition between a gel state and a sol state depending on a temperature,
    the organic polymer is at in the sol state at the first temperature, the polishing of the to-be-polished surface includes a first polishing stage in which the temperature of the polishing cloth is higher than the first temperature, the viscosity of the organic polymer in the first polishing stage is higher than the viscosity of the organic polymer at time of the supplying, the polishing of the to-be-polished surface further includes, after the first polishing stage, a second polishing stage in which the temperature of the polishing cloth is lower than that in the first polishing stage, and the viscosity of the organic polymer in the second polishing stage is lower than the viscosity of the organic polymer in the first polishing stage.

2. The polishing method according to claim 1, wherein a shear rate applied to the organic polymer in the second polishing stage is higher than that in the first polishing stage.

3. The polishing method according to claim 1, wherein the organic polymer comprises an alkyl cellulose.

4. The polishing method according to claim 1, wherein the organic polymer is a thermoresponsive polymer which is in a sol state at a temperature of not higher than a lower critical solution temperature and which makes a phase transition to a gel state when heated to a temperature exceeding the lower critical solution temperature.

5. The polishing method according to claim 4, wherein in the supplying of the polishing agent, the temperature of the polishing agent is not higher than the lower critical solution temperature, and wherein in the first polishing stage the temperature of the polishing cloth is higher than the lower critical solution temperature, wherein in the second polishing stage, the temperature of the polishing cloth is not higher than the lower critical solution temperature.

6. The polishing method according to claim 4, further comprising:

discharging the polishing agent from the polishing cloth, wherein in the discharging of the polishing agent, the temperature of the polishing cloth is not higher than the lower critical solution temperature.

7. The polishing method according to claim 4, further comprising:

cleaning the polishing cloth with a cleaning agent, wherein the cleaning of the polishing cloth includes a supplying stage of the cleaning agent in which the temperature of the cleaning agent is at a temperature at which the cleaning agent is kept in a sol state, and a cleaning stage in which the cleaning agent is at a temperature at which the cleaning agent transitions to a gel state.

8. The polishing method according to claim 1, further comprising:

discharging the polishing agent from the polishing cloth, wherein in the discharging of the polishing agent, the temperature of the polishing cloth is not higher than the first temperature.

9. A polishing method, comprising:

supplying a polishing agent from a supply section to a polishing cloth; and polishing a surface of a substrate by rotating at least one of the substrate and the polishing cloth, wherein the polishing agent comprises abrasive grains and an organic polymer which makes a reversible phase transition between a gel state and a sol state depending on a temperature, the polishing agent is supplied from the supply section at a first temperature at which the organic polymer is in a sol state, and the polishing of the to-be-polished surface includes a first polishing stage in which the polishing cloth is a second temperature that is higher than the first temperature and the organic polymer is a gel state, followed by a second polishing stage in which the temperature of the polishing cloth is less than the second temperature and the organic polymer is in a sol state.

10. The polishing method according to claim 9, wherein a shear rate applied to the organic polymer in the second polishing stage is higher than that in the first polishing stage.

11. The polishing method according to claim 10, wherein the organic polymer comprises an alkyl cellulose.

12. The polishing method according to claim 10, wherein the organic polymer is a thermoresponsive polymer.

13. The polishing method according to claim 12, further comprising:

discharging the polishing agent from the polishing cloth, wherein in the discharging of the polishing agent, the temperature of the polishing cloth is not higher than the first temperature.

14. The polishing method according to claim 9, wherein the polishing cloth is the first temperature when the polishing agent is supplied from the supply section.

15. The polishing method according to claim 9, further comprising:

discharging the polishing agent from the polishing cloth, wherein in the discharging of the polishing agent, the temperature of the polishing cloth is not higher than the first temperature.

* * * * *